United States Patent [19]

Frank et al.

[11] Patent Number: 4,583,611
[45] Date of Patent: Apr. 22, 1986

[54] WHEEL SPIN PREVENTION SYSTEM

[75] Inventors: Rüdiger Frank, Gerlingen; Herbert Schramm, Stuttgart; Werner Kopper, Möglingen; Dieter Wörner, Stuttgart, all of Fed. Rep. of Germany

[73] Assignee: Robert Bosch GmbH, Stuttgart, Fed. Rep. of Germany

[21] Appl. No.: 645,044

[22] Filed: Aug. 28, 1984

[30] Foreign Application Priority Data

Aug. 31, 1983 [DE] Fed. Rep. of Germany ....... 3331297

[51] Int. Cl.$^4$ .................... B60Q 1/00; B60K 31/00
[52] U.S. Cl. .................................. 180/197; 324/161; 340/52 R; 364/426
[58] Field of Search ................ 180/197, 233; 324/161, 324/162, 166; 364/426; 340/52 R

[56] References Cited
U.S. PATENT DOCUMENTS 4,467,886  8/1984  De Claire et al. ............. 180/197
4,484,653 11/1984  Horikoshi et al. ............ 180/197
4,509,802  4/1985  Solleder et al. .............. 180/197

Primary Examiner—John J. Love
Assistant Examiner—Donn McGiehan
Attorney, Agent, or Firm—Frishauf, Holtz, Goodman & Woodward

[57] ABSTRACT

A versatile system for preventing spinning of driving wheels, especially for commercial road vehicles, is provided by a braking control system in which a logic system responds not only to positive slip (overdriving) of each driven wheel, but also to negative slip (overbraking) thereof and, likewise, not only to over-acceleration, but also to excessive deceleration of the driven wheels. The cycle of control is started by an over-acceleration signal and terminates by the timing-out of a control phase in which hydraulic brake pressure is reduced. Within a control cycle, brake pressure builds up for a driven wheel in response to the simultaneous occurrence of any one of the following four pairs of conditions at that wheel: (a) presence of over-acceleration and of negative slip; (b) presence of over-acceleration and of positive slip; (c) presence of over-acceleration and absence of negative slip, and (d) presence of over-deceleration and of positive slip. For purposes of braking, but not for purposes of reducing engine torque, when over-acceleration occurs at a first driving wheel at one side of the vehicle, a pseudo-positive-slip signal is generated for the driving wheel on the other side, but that pseudo-signal is suppressed if at the first driving wheel there appears a slip signal or an overdeceleration signal.

20 Claims, 14 Drawing Figures

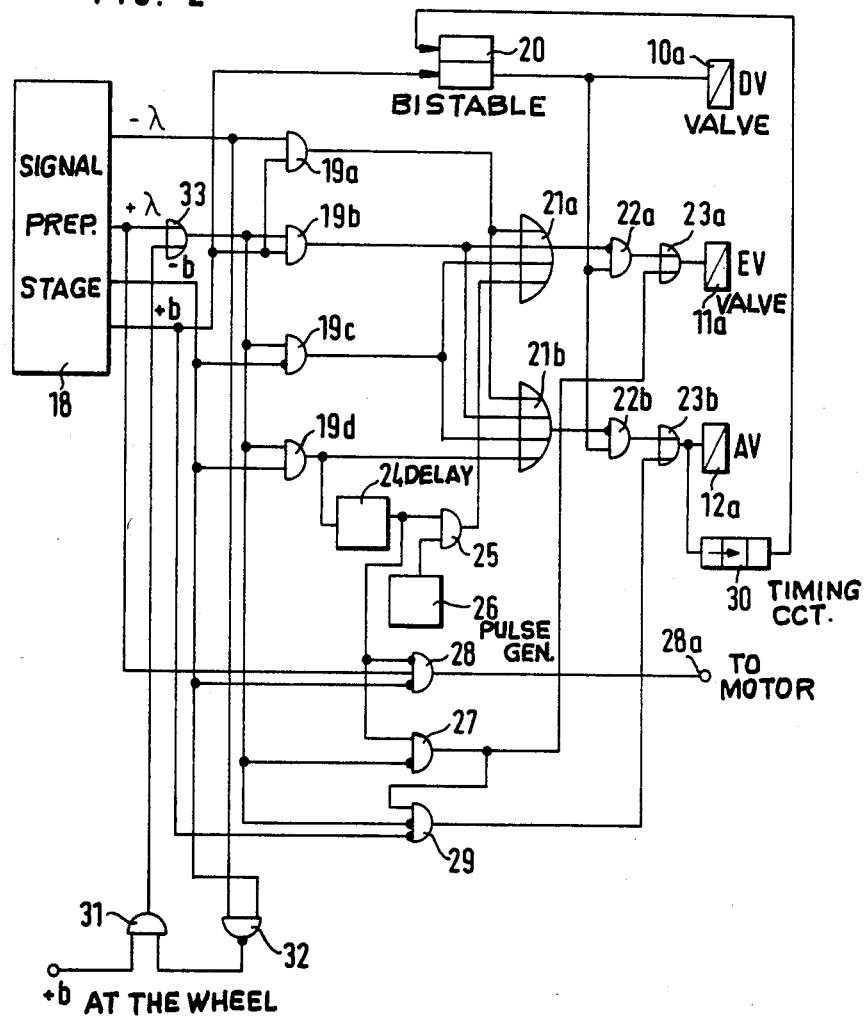

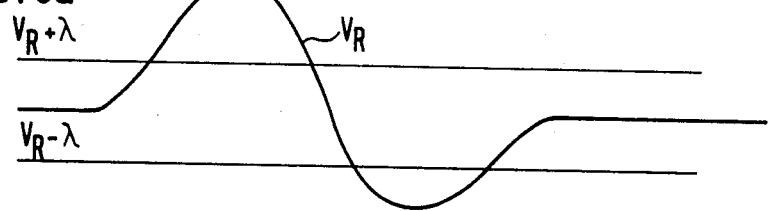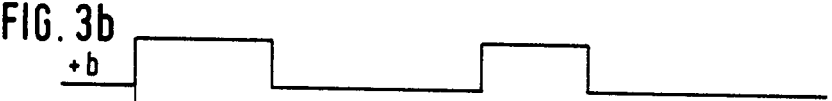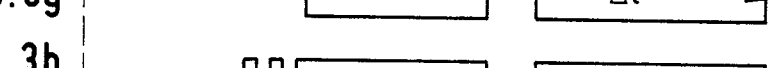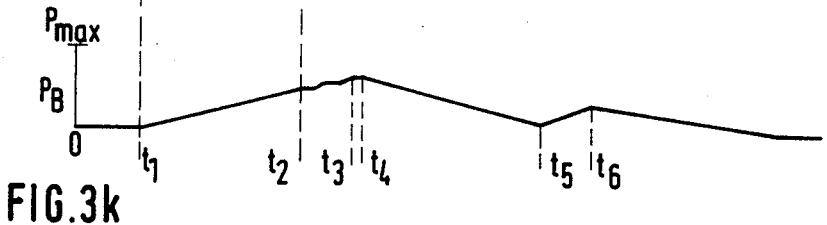

WHEEL SPIN PREVENTION SYSTEM

This invention concerns a system for preventing the spinning of the driven wheels of a motor vehicle in which signals corresponding to the wheel speed of the driven wheels are first compared with a reference signal derived from at least one of the speed values of the respective undriven wheels and, secondly, when the prescribed relation of the compared signals occurs, positive slip signals $+\lambda$ are produced and, thirdly, upon appearance of a positive slip signal $+\lambda$ for one vehicle side, this signal is utilized to activate the brake of the driven wheel belonging to that side, whereas upon simultaneous appearance of positive slip signals for both vehicle sides, then, in addition, the motor torque is reduced.

Such a system is known from German published patent application DE-OS No. 18 06 671. In that case, upon appearance of a $+\lambda$ signal, pressure is built up at the corresponding brake and when $+\lambda$ signals appear for both sides of the vehicle, the motor torque is reduced.

The system above described is useful only in a limited range of conditions.

Summary of the Invention

It is an object of the present invention to provide an improved system for preventing spinning of driven wheels which will take account of acceleration or deceleration beyond a particular limit, as well as the possibility of negative slip signals $-\lambda$ for determining more appropriate conditions in which pressure should be built up on the brake of a driving wheel.

Briefly, in the control system there are generated not only negative slip signals $-\lambda$ in a prescribed relation of the compared signals, but there are also generated acceleration signals $+b$ and deceleration signals $-b$ when acceleration and deceleration of the driven wheels respectively exceed prescribed thresholds. Then, pressure is built up at the corresponding brake according to at least one of the following AND conditions: $[(+b)*(-\lambda)]$, $[(+b)*(+\lambda)]$, $[(+\lambda)*(-\lambda b)]$ or $[(+\lambda)*(-b)]$.

By means of the invention, the control is refined and is particularly well-suited to the requirements for use in commercial vehicles.

Thre is a certain advantage for building up pressure. only at a slow rate in the case of the last-mentioned of the four AND conditions for this slow increase of pressure to build up only for a prescribed time span T. A valve of the pressure line can be driven by pulses in order to obtain relatively slow increase of pressure.

It is particularly advantageous to provide a monitoring device that checks whether the slip signal $+\lambda$ disappears during the time interval T and provides for reducing the motor torque until the disappearance of the $+\lambda$ signal, when the $+\lambda$ signal remains beyond that time span, in the absence of a deceleration signal $-b$, whereas upon disappearance of the $+\lambda$ signal in the time span T the already set-in brake pressure will be maintained.

It is also advantageous that when the $+\lambda$ signal disappears during the interval T, in the absence of $+b$ and $+\lambda$ signals, the brake pressure is reduced.

It is further advantageous to compare the duration of brake pressure reduction with a prescribed time interval and to switch off the control if brake pressure reduction persists beyond this prescribed time interval.

Further refinements of the invention include the provision of a pseudo $+\lambda$ signal for the other wheel which is used only for brake pressure modification. There are still other elaborations of the invention, but they will be described further below.

BRIEF DESCRIPTION OF THE DRAWINGS

The invention is further described by way of illustrative example, with reference to the annexed drawings, in which:

FIG. 2 is a control logic diagram for one side of a vehicle for controlling the brake pressure on the brake belonging to the driven wheel of that side of the vehicle;

FIG. 3a–3k is a timing diagram relating to the signals appearing in the system of FIG. 2, and the brake pressure course resulting therefrom;

DESCRIPTION OF THE ILLUSTRATED EMBODIMENTS

Figure 1:
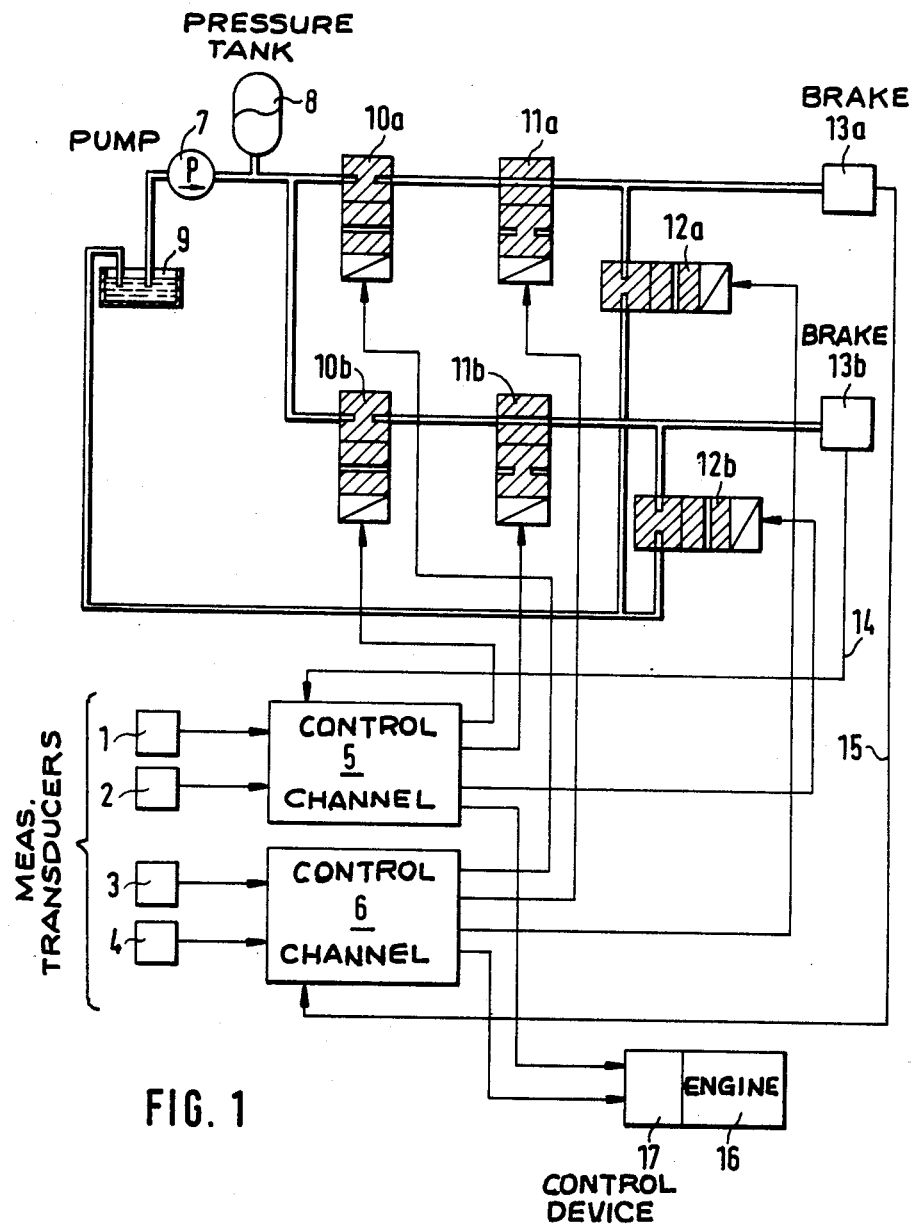
FIG. 1 is a block circuit diagram of a system according to the invention in which hydraulic lines are shown in broken lines and electric connections in full lines.

FIG. 1 shows measuring transducers 1–4 respectively belonging to the four wheels of a vehicle. Each of these transducers provides the velocity signal derived from the corresponding wheel which is then supplied to control channels 5 and 6. The sensors 1 and 3 relate to driven wheels and the sensors 2 and 4 to undriven wheels. Control signals for valves 10a and 10b, 11a and 11b, as well as 12a and 12b, are generated in the control channels 5 and 6. A pump 7 and a pressure storage tank 8 are also shown. The pump takes a pressure medium from a reservoir 9. At 13a and 13b appear the brakes of the respective driven wheels.

It is assumed in FIG. 1 that the inlet valves 11a and 11b and the outlet valves 12a and 12b simultaneously serve as the valves for an anti-blocking system (i.e., as ABS valves). It is accordingly necessary to supplement them with pressure valves 10a and 10b over which it is possible to switch on the pressure source 7–9 to the wheel brakes 13a and 13b for preventing spinning of the driven wheels. In order to prevent overheating of the brakes, temperature sensors 13a and 13b are provided for the brakes. These sensors provide signals respectively over lines 14 and 15 to the control channels 5 and 6 whenever a prescribed temperature threshold is exceeded. In addition, the torque of the engine 16 is also affected by operation of the control channels 5 and 6. Corresponding control signals from these control channels accordingly go to a control device 17 by which the fuel supply of the engine 16 can be affected.

FIG. 2 shows the control logic for one side of the vehicle. The valves of this vehicle side are designated 10a to 12a as in FIG. 1. Four different signals are produced in a signal preparation stage 18, namely a $-\lambda$ signal, a $+\lambda$ signal, a $-b$ signal and a $+b$ signal. A $+\lambda$ signal appears when the velocity of the driven wheel exceeds the velocity of the undriven wheel by some predetermined value. The $-\lambda$ signal is produced when the velocity of the undriven wheel exceeds that of the driven wheel by a predetermined amount. A $+b$ signal is produced when the velocity of the driven wheel has an acceleration beyond a predetermined acceleration threshold; correspondingly a $-b$ signal is produced when the velocity of the driven wheel has a deceleration greater than a prescribed deceleration threshold. The $+b$ output of the signal preparation stage 18 is connected to a bistable circuit 20 which is set by this $+b$ signal and then turns on the pressure valve 10a. As further shown below, the bistable circuit 20 is reset when the danger of spinning the wheels has been avoided. The AND correlations set forth above in the summary of the invention are detected in the AND gates 19a, 19b, 19c and 19d.

The AND gate 19a provides a signal when a $+b$ signal is present, but no $-\lambda$ signal is present. AND gate 19b correspondingly produces a signal when a $+b$ signal is present and likewise a $+\lambda$ signal. The AND gate 19c provides a signal when there is a $+\lambda$ signal but no $-b$ signal and, finally, the AND gate 19d provides and output signal when a $+\lambda$ signal is present and also a $-b$ signal.

The outputs of the AND gates 19a and 19c are connected to inputs of the OR gates 21a and 21b. These provide a signal whenever one or more of the AND gates 19a to 19c provides a signal. In so doing, they block at this time the AND gates 22a and 22b. The latter also receive, as an input, the output signal of the bistable circuit 20.

Thus, control signals reach the valves 11a and 12a through AND gates 22a and 22b and the respective OR gates 23a and 23b so long as none of the AND gates 19a to 19c provides a signal. In the illustrated construction of the valves 11a and 12a, pressure is built up if none of the valves is energized on; pressure is maintained constant if only the valve 11a is energized, and pressure is reduced when both valves 11a and 12a are energized.

The output signal of the AND gate 19b likewise proceeds to the OR gate 21b and thereby prevents response of the outlet valve 12a. In addition, however, the output signal of the AND gate 19b is also supplied to the delay unit 24 which is set by the leading edge of that signal and accordingly provides an output signal which lasts for a predetermined time T. An AND gate 25 is thereby turned on, which then allows pulses of the pulse generator 26 to pass during the time interval T. These pulses are supplied to the AND gate 21a. During the time interval T, the inlet valve is thereby pulsed, which corresponds to a pressure rise at a reduced rate.

By means of an AND gate 27, it is determined whether within the time interval T the $+\lambda$ signal vanishes. If that is indeed the case, an output signal of the AND gate 27 passes through the OR gate 23a to the inlet valve and activates it. In consequence, the brake pressure already established is maintained constant.

By means of an AND gate 28, the situation is detected in which the $+\lambda$ signal does not vanish within the time interval T of the timing circuit 24. If at the same time no $-b$ signal is present, the AND gate 28 provides an output signal that is supplied to the engine for influencing the engine torque. This feature is further explained with reference to FIG. 4.

It was explained above that the output signal of the AND gate 27 energizes the inlet valve and that at the outset, the established pressure is maintained. By means of an AND gate 29, it then check whether the $+\lambda$ signal and the $+b$ signal have vanished. If that is the case, the AND gate 29 provides an output signal that energizes the outlet valve 12a so that pressure sinks. The energized time of the outlet valve is monitored by means of a timing circuit 30. If this interval lasts longer than a predetermined time set by the time constant of the timing circuit 30, the timing circuit 30 provides an output signal that resets the bistable circuit 20. The control cycle is thereby terminated.

The control logic shown in FIG. 2 also has an AND gate 31 which is connected on the one hand to the inverted output of an OR gate 32 and on the other hand to a line through which a $+b$ signal of the other driven wheel can be supplied. An output signal of the AND gate 31 is supplied to the OR gate 33. This logic pattern means that when a $+b$ signal appears at the other driven wheel, a pseudo $+\lambda$ signal is produced at the wheel under consideration so long as no $-b$ signal and/or no $-\lambda$ signal is present at the wheel under consideration. This pseudo $+\lambda$ signal is used like a $+\lambda$ signal so far as the brake pressure control is concerned, but it is not, however, utilized for engine control.

The manner of operation of the control logic of FIG. 2 is now to be explained with reference to the timing diagram of FIG. 3. Curve (a) of FIG. 3 shows the speed trace of a driven wheel that spins, its speed being $V_{Ran}$. The horizontal lines intersecting the curve $V_{Ran}$ represent the thresholds $V_R+\lambda$ and $V_R-\lambda$, at which $+\lambda$ signals and $-\lambda$ signals respectively begin when the wheel speed passes beyond the threshold. $V_R$ is in this case, for example, a signal corresponding to the speed of the undriven wheel of the same vehicle side, or the smaller of the signals are obtained respectively at the undriven wheels. In the signal preparation stage 18, from the wheel behavior represented by the curve $V_{Ran}$, THERE are produced acceleration signals $+b$ shown on line (b) of FIG. 3, $+\lambda$ signals corresponding to line (c), $-b$ signals corresponding to line (d) and $-\lambda$ signals corresponding to line (e).

In line (f) of FIG. 3 is shown the switching condition of the pressure valve 10a, in line (g) the switching condition of the outlet valve 12a and in line (h) the switching condition of the inlet valve 11a. Finally, there is shown in line (i) the output of the bistable circuit 20. The course of the pressure at the brake of the driven wheel produced by the abovementioned signals in the control logic of FIG. 2 is graphed by line (k) of FIG. 3.

The appearance of a $+b$ signal sets the bistable circuit 20 and the output signal of line (i) of FIG. 3 is produced. The pressure valve 10a is turned on, i.e., pressure buildup begins ($t_1$). Until the instant $t_2$, the output signals of the AND gates 19a to 19c prevent the switching condition of the valves 11a and 12a from being changed at all. The appearance of the $-b$ signal at the instant $t_2$ when at the same time a $+\lambda$ signal is present, allows an output to be produced by the AND gate 19d which sets the timing circuit 24. The pulses of the pulse generator 26 are then supplied to the inlet valve 11a through the AND gate 25, as the result of which the inlet valve is pulsed and the pressure is built up only quite slowly. Since in the case here assumed the $+\lambda$ signal vanishes before the interval T of the timing circuit 24 has run out, the inlet valve is energized through the AND gate 27 and the pressure is thereby held constant for a short interval ($t_3$ to $t_4$). Since the AND gate 29, however, still finds that no $+\lambda$ and no $+b$ signals are present, it produces a signal that turns on the outlet valve 12a and thereby begins the diminution of pressure. This situation is maintained until $t_5$, because in this time none of the AND gates 19a to 19d produces an output signal which would prevent energization of the valves 11a and 12a.

From the instant $t_5$ the AND gate 19a, however, recognizes that a +b signal appears while no −λ signal is present. In consequence, the AND gates 22a and 22b are blocked and thus any further energizing of the valves 11a and 12a is prevented. Pressure is therefore built up and this happens until $t_6$, at which instant the +b signal vanishes. Since now again no signal from the gates 19a to 19d prevents the energizing of the valves 11a and 12a in response to the signal of the bistable circuit 20, a pressure reduction begins. The duration of the energization of the outlet valve 12a is monitored by the timing circuit 30. If energization of the outlet valve lasts longer than the time constant Δt of this timing circuit 30, total reduction of pressure is then provided without requiring a renewed −b or λ signal. The output signal 30 then produced then resets the bistable circuit 20: the pressure control is thereby terminated.

Since when a slipping wheel is braked, braking torque is transmitted through the differential as a driving torque for the non-slipping wheel, a sudden pulling force increase takes place which in certain circumstances could lead to instability by slipping alternately on one side or the other. A simultaneous pressure reduction should therefore take place at the other wheel, so that the rise of driving torque at the non-slipping wheel may be damped. For this purpose, when a +b signal appears at the other wheel, a pseudo +λ signal is produced by means of the AND gate 31 which is coupled in the control logic of FIG. 2 through the OR gate 33. This pseudo +λ signal is suppressed only if a −λ or a −b signal appears at the wheel under consideration in FIG. 2, such signals indicating overbraking of the wheel.

It should further be mentioned that the control of the brake pressure for preventing wheel spinning will be interrupted immediately, or not started, if the wheel is to be braked, for example, when the brake light switch is actuated and produces a corresponding signal for the control system.

Figure 4:
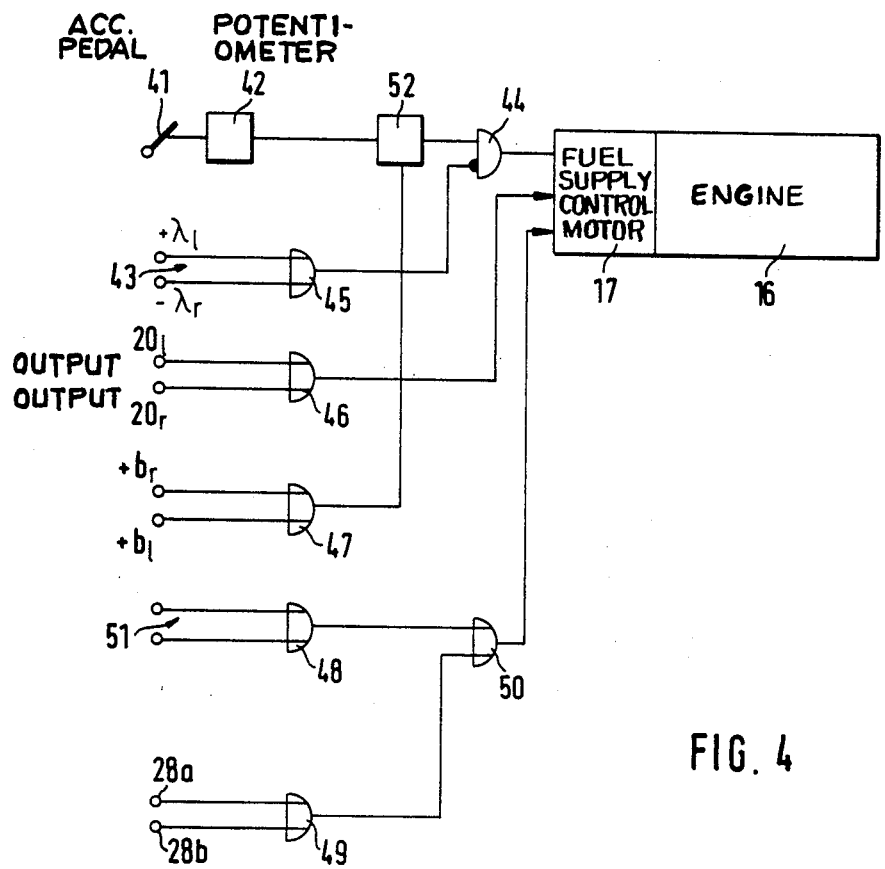
FIG. 4 is a logic diagram relating to control of the motor torque in accordance with the invention.

The possible ways of affecting the torque of the engine 16 will now be explained in more detail with reference to FIG. 4. It is assumed in this case that the fuel supply of the engine is remotely controlled electrically. A potentiometer 42 is shifted by the accelerator pedal 41 and the signal from the potentiometer is supplied to a block 17 which contains an electric motor that controls the fuel supply to the engine 16 in a manner dependent upon the position of the accelerator pedal 41. The plus signals of the left and right vehicle sides are respectively applied to the terminals 43. If a plus signal appears, an AND gate 44 is blocked through an OR gate 45 and a further increase of the engine torque is thereby prevented. If the brake pressure control at both drive wheels is active, i.e., the bistable circuits 20 for both vehicle sides are set, the AND gate 46 produces a signal that has the result of reducing the engine torque at a defined slope. In the same way a reduction of the engine torque takes place if a signal appears at the terminal 28a or at the unshown terminal 28b of FIG. 2 (neither is shown in FIG. 4). Such a signal appears when at the end of the time constant period of the delay circuit 24 there is a +λ signal present, but no −b signal has appeared. Finally, there is also a backing down of the engine torque when a signal appears at the terminals 51 that indicates that the temperature at one of the brakes has exceeded a critical value. Here also the engine torque is modified through an OR gate 48 and the OR gate 50. If at one vehicle side a +b signal appears, it is desired that the engine torque should not be affected corresponding to actuation of the pedal 41, but rather contrary thereto. In the connection line between the potentiometer 42 and the block 17, a circuit block 52 is interposed which, when activated by an OR gate 47, produces the effect that signal changes at the output of the potentiometer 42 have only delayed effect in the block 17, i.e., delayed in modification of the engine torque.

Instead of an electric fuel supply rate control, the block 17 may represent an ignition timing retard control if the engine is equipped for torque reduction by spark retard.

Figure 5:
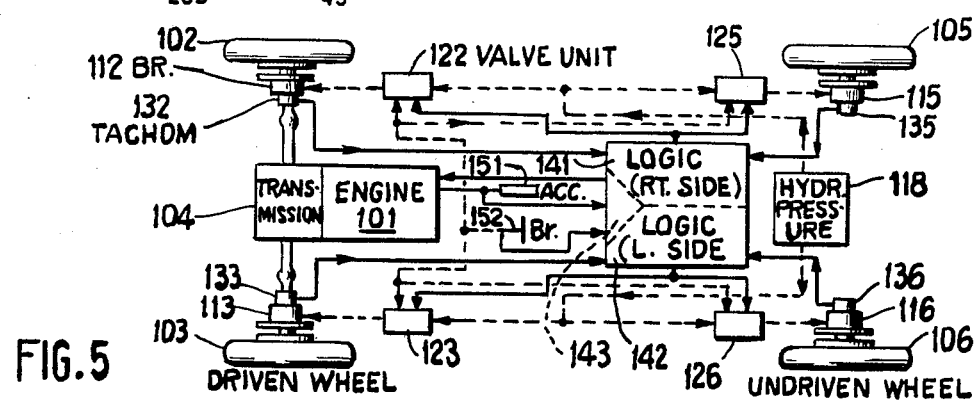
FIG. 5 is a basic schematic diagram of a vehicle equipped with a system according to FIGS. 1–4.

FIG. 5 is a basic diagram, a vehicle equipped with a complete system according to FIGS. 1-4. The engine 101 drives the driven wheels 102 and 103 through a transmission 104. The undriven wheels 105 and 106 are at the rear. The wheels 102 and 103 respectively have brakes 112 and 113 respectively controlled by valve units 122 and 123. The wheels 105 and 106 respectively have brakes 115 and 116 respectively controlled by valve units 125 and 126. Pressurized fluid is supplied to the valve units from a pressure unit 118. Tachometer (speed sensors) 132, 133, 135 and 136 are respectively provided for the wheels 102, 103, 105 and 106. Right side logic 141 controls the valve units 122 and 125. Left side logic 142 controls the valve units 123 and 126. Common logic 143 interconnected with logic 141 and 142 controls the engine torque when needed and receives information from the accelerator pedal 151 and the brake pedal 152. The details of connection are as set forth in FIGS. 1-4.

We claim:

1. System for preventing spinning of driven wheels of a vehicle having a propulsion engine, driven and undriven wheels on both sides of said vehicle and hydraulic brakes for the said respective wheels, in which there are provided first means for comparing these signals representative of the rotary speeds of said driven wheels with reference signals derived from the rotary speed of at least one said undriven wheel, second means for producing positive wheel slip signals (+λ) when comparison results produced by said first means fulfill a predetermined relation, third means, for activating the brake of a said driven wheel on a side of said vehicle in response to a said positive wheel slip signal (+λ) produced by said first means with respect to said driven wheel on said side of said vehicle and fourth means for reducing the output torque of said engine in response to the production by said first means of positive wheel slip signals (+λ) with reference to said driven wheels on both sides of said vehicle, said system further comprising:

fifth means for producing negative wheel slip signals (−λ) in response to comparison results of said first means indicative of negative wheel slip;

sixth means responsive said first signals for comparing acceleration of the rotation of said driven wheel with respect to a reference value of acceleration to produce over-acceleration signals (+b) when the acceleration of the respective driven wheel exceeds said reference value of acceleration and for comparing deceleration of the rotation of said driven wheels with respect to a reference value of deceleration to produce over-deceleration signals (−b) when the deceleration of the respective driven wheel exceeds said reference value of deceleration, and logic network circuit means and hydraulic brake pressure modifying means responsive thereto for producing a build-up of hydraulic pressure for operation of the brake of a said driven wheel in response to the simultaneous occurrence, with respect to said driven wheel of at least one of the following four pairs of signal conditions:

(a) presence of over-acceleration (+b) and of negative slip (−λ);

(b) presence of over-acceleration (+b) and of positive slip (+λ);

(c) presence of over-acceleration (+b) and absence of negative slip (−λ);

(d) presence of over-deceleration (−b) and of positive slip (+λ).

2. System according to claim 1, in which said logic means and pressure modifying means are constituted for building up brake pressure at a reduced rate in response to the simultaneous presence of a positive slip over-acceleration signal (+λ) and of an over-deceleration signal (−b) relating to the same driven wheel.

3. System according to claim 2, in which said logic circuit means and brake pressure modifying means are constituted for causing buildup of hydraulic brake pressure at a reduced rate only for a prescribed time interval T, at the end of which buildup of brake pressure ceases.

4. System according to claim 3, in which said hydraulic brake pressure modifying means includes a valve in a hydraulic pressure line of a hydraulic brake and means for producing pulsed operation of said valve for obtaining a buildup of hydraulic brake pressure at a reduced rate.

5. System according to claim 4, including slip signal monitoring means for detecting whether a positive slip signal produced by said first means disappears before the conclusion of said time interval T, for maintaining a built up hydraulic pressure following the end of said interval T in the event that said positive slip signal disappeared before the end of said interval T, and for activating said second means in order to reduce engine torque when said positive slip signal persists, during absence of an over-deceleration signal (−b), following the end of said interval T.

6. System according to claim 5, in which said logic network circuit means and hydraulic brake pressure modifying means are constituted to reduce hydraulic brake pressure following the end of said interval T if, and so long as, after the end of said interval T neither an over-acceleration signal (+b) nor a positive slip signal (+λ) is present.

7. System according to claim 6, in which said logic network circuit means and hydraulic brake pressure modifying means include means for comparing the duration of time during which brake pressure is reduced following said interval T with a predetermined time duration, and for discontinuing the control of the system on hydraulic brake pressure by the system in the event said brake pressure reducing time extends beyond said predetermined time duration.

8. System according to claim 1, including eighth means responsive to said logic network circuit means and operatively connected to said hydraulic brake pressure modifying means for responding to an over-acceleration signal (+b) relating to a first driven wheel on a first side of said vehicle, by producing a pseudo-positive-slip signal for a second driven wheel on the second side of said vehicle, and for suppressing said pseudopositive-slip signal in the event a negative slip signal or an over-deceleration signal should appear with reference to said first driven wheel, whereby said pseudo-positive-slip signal is utilized only for modifying hydraulic brake pressure.

9. System according to claim 7, including eighth means responsive to said logic network circuit means and operatively connected to said hydraulic brake pressure modifying means for responding to an over-acceleration signal (+b) relating to a first driven wheel on a first side of said vehicle, by producing a pseudo-positive-slip signal for a second driven wheel on the second side of said vehicle, and for suppressing said pseudopositive-slip signal in the event a negative slip signal or an over-deceleration signal should appear with reference to said first driven wheel, whereby said pseudo-positive-slip signal is utilized only for modifying hydraulic brake pressure.

10. System according to claim 1, in which tenth means, cooperating with said fourth means, are provided for holding engine torque constant during the presence of a slip signal, whether said slip signal denotes a positive slip (+λ), or a negative slip (−λ).

11. System according to claim 9, in which tenth means, cooperating with said fourth means, are provided for holding engine torque constant during the presence of a slip signal, whether said slip signal denotes a positive slip (+λ), or a negative slip (−λ).

12. System according to claim 1, in which said hydraulic brake pressure modifying means includes pressure control valve means in the respective hydraulic medium supply lines, for said brakes of said driven wheels respectively on the two sides of said vehicle and in which eleventh means are provided, cooperating with said fourth means, for reducing engine torque whenever both said pressure control valve means operated to increase hydraulic brake pressure for the brakes of both driven wheels.

13. System according to claim 11, in which said hydraulic brake pressure modifying means includes pressure control valve means in the respective hydraulic medium supply lines, for said brakes of said driven wheels respectively on the two sides of said vehicle and in which eleventh means are provided, cooperating with said fourth means, for reducing engine torque whenever both said pressure control valve means operated to increase hydraulic brake pressure for the brakes of both driven wheels.

14. System according to claim 1, in which said vehicle is equipped with means for controlling the fuel supply to said engine and an accelerator pedal of said engine controllable by the driver of said vehicle, said system comprising twelfth means for reducing the fuel supply rate controlled by said pedal during the presence of a said over-deceleration signal.

15. System according to claim 13, in which said vehicle is equipped with means for controlling the fuel supply to said engine and an accelerator pedal of said engine controllable by the driver of said vehicle, said system comprising twelfth means for reducing the fuel supply rate controlled by said pedal during the presence of a said over-deceleration signal.

16. System according to claim 1, in which said engine of said vehicle is equipped with a spark timing retarder and said fourth means is constituted to reduce engine torque by spark timing retard.

17. System according to claim 15, in which said engine of said vehicle is equipped with a spark timing retarder and said fourth means is constituted to reduce engine torque by spark timing retard.

18. System according to claim 1, in which said vehicle is equipped with means for monitoring the temperature of said brakes of said driven wheels, said system incorporating thirteenth means responsive to said temperature monitoring means and cooperating with said fourth means for reducing the torque of said engine when the temperature at at least one of said brakes of said driven wheels exceeds a predetermined temperature.

19. System according to claim 1, in which computing means are provided responsive to said hydraulic brake pressure modifying means for keeping track of the time intervals during which hydraulic brake pressure is caused to change for said brakes of said driving wheel and for computing therefrom a magnitude representative of heat dissipation by said brakes and comparing said computed magnitude with a reference limit value, as well as cooperating with said fourth means for reducing the torque of said engine when said computed value for one of said driven wheels exceeds said reference limit value.

20. System according to claim 19, in which rotary speed sensors for said driven wheels are provided in the neighborhood of the brakes of said driven wheels, have known temperaturedependent resistance characteristics and are connected to inputs of said computing means, said computing means being constituted to compute the temperature of the respective brakes by evaluation of the states of said sensor in terms of their said temperature dependent resistance characteristics.

* * * * *